(12) United States Patent
Oman et al.

(10) Patent No.: US 11,598,838 B2
(45) Date of Patent: Mar. 7, 2023

(54) DETECTION DEVICE

(71) Applicant: Aptiv Technologies Limited, St. Michael (BB)

(72) Inventors: Todd P. Oman, Greentown, IN (US); Michael L. Meno, Bailey, CO (US); Kris R. Stark, Carmel, IN (US)

(73) Assignee: Aptiv Technologies Limited, St. Michael (BB)

( * ) Notice: Subject to any disclaimer, the term of this patent is extended or adjusted under 35 U.S.C. 154(b) by 531 days.

(21) Appl. No.: 16/452,594

(22) Filed: Jun. 26, 2019

(65) Prior Publication Data
US 2020/0408869 A1 Dec. 31, 2020

(51) Int. Cl.
*G01S 5/02* (2010.01)
*B60R 25/20* (2013.01)
(Continued)

(52) U.S. Cl.
CPC .......... *G01S 5/0284* (2013.01); *B60R 25/209* (2013.01); *B60R 25/245* (2013.01); *G01S 5/14* (2013.01)

(58) Field of Classification Search
CPC ....... G01S 5/0284; G01S 5/14; B60R 25/209; B60R 25/245
See application file for complete search history.

(56) References Cited

U.S. PATENT DOCUMENTS

| | | | |
|---|---|---|---|
| 5,170,165 | A | 12/1992 | Iishoshi et al. |
| 6,127,931 | A | 10/2000 | Mohr |

(Continued)

FOREIGN PATENT DOCUMENTS

| | | |
|---|---|---|
| CN | 105830470 A | 8/2016 |
| CN | 107005789 A | 8/2017 |

(Continued)

OTHER PUBLICATIONS

"Corrected Notice of Allowance", U.S. Appl. No. 15/980,809, dated Mar. 1, 2019, 4 pages.

(Continued)

*Primary Examiner* — Thomas D Alunkal
(74) *Attorney, Agent, or Firm* — Sawtooth Patent Group PLLC

(57) ABSTRACT

A detection device includes at least one detection module communicatively coupled with a communication device. The detection module includes a controller circuit communicatively coupled with a first antenna. The first antenna receives first electromagnetic signals from a first plurality of antennae located within an interior of a first vehicle. The first antenna receives second electromagnetic signals from a second plurality of antennae located and within an interior of a second vehicle. The controller circuit determines a position of the communication device within the interior of the first vehicle relative to locations of the first plurality of antennae based on the first electromagnetic signals received by the first antenna. The controller circuit determines a position of the communication device within the interior of the second vehicle relative to locations of the second plurality of antennae based on the second electromagnetic signals received by the first antenna.

20 Claims, 12 Drawing Sheets

(51) Int. Cl.
    *B60R 25/24*    (2013.01)
    *G01S 5/14*    (2006.01)

(56) References Cited

U.S. PATENT DOCUMENTS

| | | | |
|---|---|---|---|
| 6,297,737 | B1 | 10/2001 | Irvin |
| 6,838,987 | B1 | 1/2005 | Quinonez |
| 6,895,310 | B1 | 5/2005 | Kolls |
| 7,479,889 | B2 | 1/2009 | Kazdin et al. |
| 7,548,491 | B2 | 6/2009 | Macfarlane |
| 7,696,887 | B1 * | 4/2010 | Echavarria ......... G08B 21/0227 340/573.1 |
| 8,335,502 | B2 | 12/2012 | Oesterling et al. |
| 8,373,581 | B2 | 2/2013 | Hassan et al. |
| 8,494,447 | B2 | 7/2013 | Oesterling et al. |
| 8,547,253 | B2 | 10/2013 | Proefke et al. |
| 8,571,725 | B2 | 10/2013 | Juzswik |
| 9,154,920 | B2 | 10/2015 | O'Brien et al. |
| 9,894,492 | B1 * | 2/2018 | Elangovan ............ H04W 4/40 |
| 10,317,517 | B1 | 6/2019 | Dsilva et al. |
| 10,641,880 | B2 * | 5/2020 | Dsilva ..................... G01S 5/02 |
| 2001/0035811 | A1 | 11/2001 | Dewan |
| 2003/0034887 | A1 | 2/2003 | Crabtree et al. |
| 2003/0231550 | A1 | 12/2003 | Macfarlane |
| 2004/0066293 | A1 | 4/2004 | Maloney et al. |
| 2004/0130440 | A1 | 7/2004 | Boulay et al. |
| 2005/0012595 | A1 | 1/2005 | Dewan |
| 2005/0099275 | A1 | 5/2005 | Kamdar et al. |
| 2005/0107673 | A1 | 5/2005 | Ball |
| 2005/0248436 | A1 | 11/2005 | Hohmann et al. |
| 2006/0284769 | A1 | 12/2006 | Bolduc et al. |
| 2007/0050086 | A1 | 3/2007 | Lim et al. |
| 2007/0090965 | A1 | 4/2007 | McCall |
| 2007/0268110 | A1 | 11/2007 | Little |
| 2007/0285230 | A1 | 12/2007 | Anglin |
| 2007/0290819 | A1 | 12/2007 | Teshima et al. |
| 2009/0015373 | A1 | 1/2009 | Kelly et al. |
| 2009/0091477 | A1 | 4/2009 | McCall et al. |
| 2009/0224946 | A1 | 9/2009 | King et al. |
| 2009/0278656 | A1 | 11/2009 | Lopez et al. |
| 2010/0076622 | A1 | 3/2010 | Dickerhoof et al. |
| 2010/0302102 | A1 | 12/2010 | Desai et al. |
| 2010/0305779 | A1 | 12/2010 | Hassan et al. |
| 2011/0021234 | A1 | 1/2011 | Tibbitts et al. |
| 2011/0040424 | A1 | 2/2011 | Lickfelt et al. |
| 2011/0105097 | A1 | 5/2011 | Tadayon et al. |
| 2011/0133962 | A1 | 6/2011 | King et al. |
| 2011/0148573 | A1 | 6/2011 | Ghabra et al. |
| 2012/0092129 | A1 | 4/2012 | Lickfelt |
| 2012/0172010 | A1 | 7/2012 | Oman et al. |
| 2012/0214466 | A1 | 8/2012 | Tadayon et al. |
| 2012/0244877 | A1 | 9/2012 | Margalef et al. |
| 2013/0017816 | A1 | 1/2013 | Talty et al. |
| 2013/0188538 | A1 | 7/2013 | Kainulainen et al. |
| 2013/0295908 | A1 | 11/2013 | Zeinstra et al. |
| 2013/0342379 | A1 | 12/2013 | Bauman et al. |
| 2014/0058586 | A1 | 2/2014 | Kalhous et al. |
| 2014/0129051 | A1 | 5/2014 | Gautama et al. |
| 2014/0163771 | A1 | 6/2014 | Demeniuk |
| 2014/0169564 | A1 | 6/2014 | Gautama et al. |
| 2014/0240091 | A1 | 8/2014 | Talty et al. |
| 2014/0308971 | A1 | 10/2014 | O'Brien et al. |
| 2015/0063329 | A1 | 3/2015 | Frye et al. |
| 2015/0109116 | A1 | 4/2015 | Grimm et al. |
| 2015/0148989 | A1 * | 5/2015 | Cooper .................. E05F 15/77 701/2 |
| 2015/0235487 | A1 | 8/2015 | Proefke et al. |
| 2015/0363988 | A1 | 12/2015 | Van Wiemeersch et al. |
| 2015/0363998 | A1 | 12/2015 | Comeau et al. |
| 2016/0049033 | A1 | 2/2016 | Sigal et al. |
| 2016/0071395 | A1 | 3/2016 | Demeniuk et al. |
| 2016/0142877 | A1 * | 5/2016 | Gujral .................... E05F 15/77 455/456.1 |
| 2016/0276873 | A1 | 9/2016 | Hanoch et al. |
| 2016/0318475 | A1 | 11/2016 | Honkanen |
| 2016/0320469 | A1 | 11/2016 | Laifenfeld et al. |
| 2017/0052538 | A1 * | 2/2017 | Li ......................... H04W 4/48 |
| 2017/0111766 | A1 | 4/2017 | Muramatsu et al. |
| 2017/0318612 | A1 * | 11/2017 | Gu .................... H04W 52/0206 |
| 2018/0192250 | A1 | 7/2018 | Li et al. |
| 2018/0234797 | A1 * | 8/2018 | Ledvina ................. G07C 9/29 |
| 2018/0309869 | A1 * | 10/2018 | Moir ...................... H04W 4/80 |
| 2018/0316788 | A1 | 11/2018 | Elliott |
| 2019/0025402 | A1 * | 1/2019 | Qu ......................... G01S 11/14 |
| 2019/0353766 | A1 | 11/2019 | Dsilva et al. |
| 2020/0262392 | A1 | 8/2020 | Oman et al. |

FOREIGN PATENT DOCUMENTS

| | | |
|---|---|---|
| CN | 108307294 A | 7/2018 |
| WO | 2008154747 | 12/2008 |

OTHER PUBLICATIONS

"Extended European Search Report", EP Application No. 20150008.9, dated Jun. 8, 2020, 8 pages.

"Extended European Search Report", EP Application No. 19171587.9, dated Oct. 18, 2019, 10 pages.

"Non-Final Office Action", U.S. Appl. No. 16/275,374, dated Apr. 13, 2020, 11 pages.

"Non-Final Office Action", U.S. Appl. No. 16/399,002, dated Sep. 20, 2019, 12 pages.

"Non-Final Office Action", U.S. Appl. No. 16/275,374, dated Oct. 4, 2019, 12 pages.

"Notice of Allowance", U.S. Appl. No. 16/399,002, dated Jan. 16, 2020, 14 pages.

"Notice of Allowance", U.S. Appl. No. 15/980,809, dated Feb. 5, 2019, 13 pages.

U.S. Appl. No. 15/980,809, Vehicle Location Device, filed May 16, 2018, Dsilva et al.

U.S. Appl. No. 16/275,374 Positioning System and Method, filed Feb. 14, 2019, Oman et al.

"Extended European Search Report", European Application No. 20174158.4, dated Nov. 17, 2020, 6 pages.

"Final Office Action", U.S. Appl. No. 16/275,374, dated Oct. 16, 2020, 13 pages.

"Foreign Office Action", CN Application No. 202010586143.0, dated Jun. 20, 2022, 14 pages.

"Foreign Office Action", CN Application No. 202010586143.0, dated Nov. 18, 2022, 17 pages.

* cited by examiner

DETECTION DEVICE

TECHNICAL FIELD OF INVENTION

This disclosure generally relates to a detection device that determines a position of a communication device relative to a vehicle.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
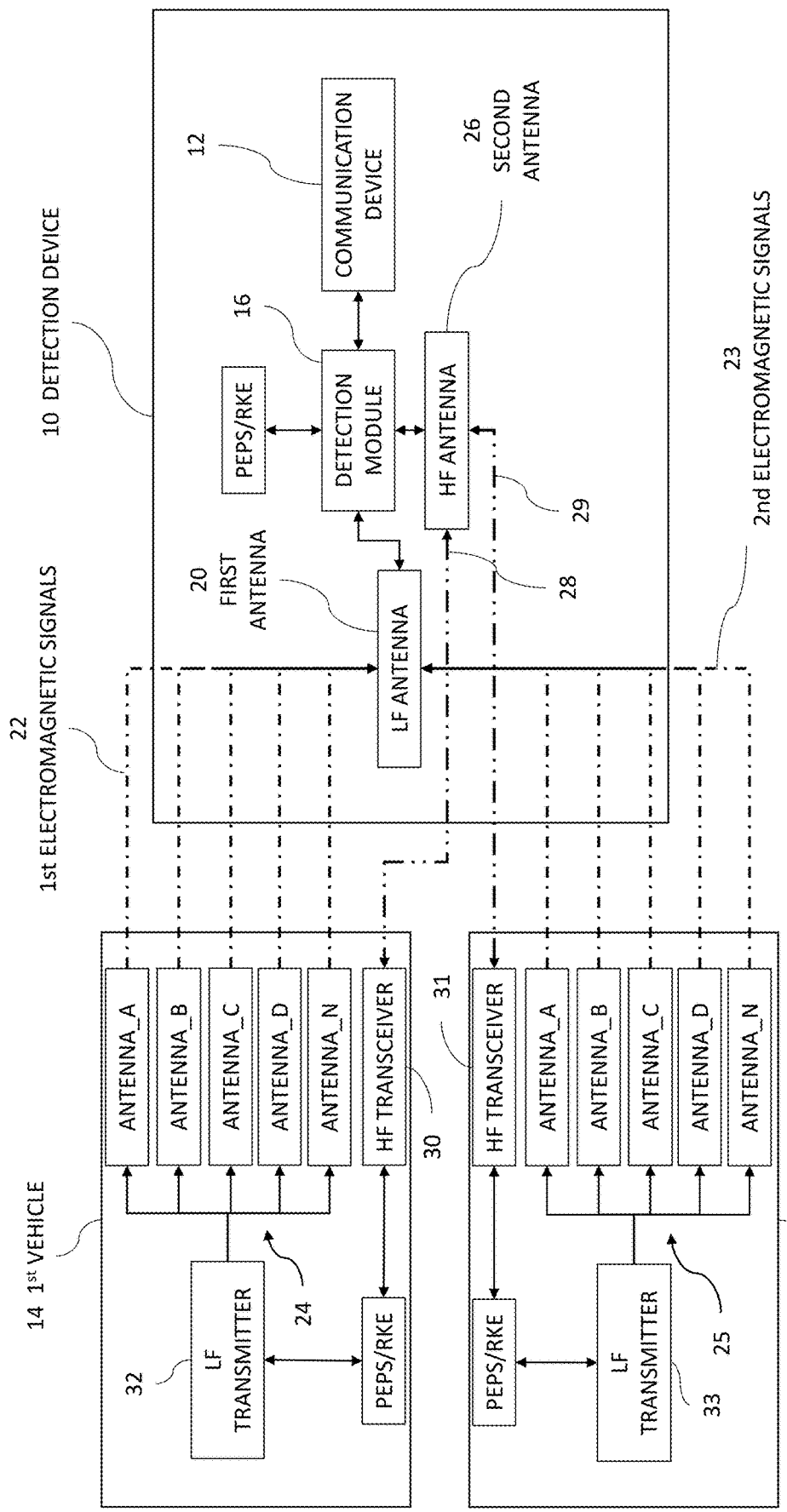
FIG. 1 is an illustration of a detection device in accordance with one embodiment.

FIG. 1 illustrates an example of a detection device 10. As will be described in more detail below, the detection device 10 may provide various improvements over other detection systems. For example, the detection device 10 may reduce occurrences of distracted driving from a communication device 12 accessible to an operator of a vehicle 14 by disabling the communication device 12 when likely used by the operator, and may be used in multiple vehicles. As used herein, the communication device 12 may be a smartphone, a computer, a tablet, a laptop, a wearable device (e.g., a smartwatch, etc.) or any other portable device that allows a communication with at least one other device and/or other system.

The detection device 10 includes at least one detection module 16 communicatively coupled with the communication device 12. The detection module 16 includes at least one controller circuit 18 (see FIGS. 3-5) communicatively coupled with a first antenna 20. The controller circuit 18 may include a processor (not shown) such as a microprocessor or other control circuitry such as analog and/or digital control circuitry. The control circuitry may include one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The controller circuit 18 may also combine custom hard-wired logic, ASICs, or FPGAs with custom programming to accomplish the techniques. The controller circuit 18 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 18 may include other examples of non-volatile memory, such as flash memory, read-only memory (ROM), programmable read-only memory (PROM), and erasable programmable read-only memory (EPROM). The controller circuit 18 may include volatile memory, such as dynamic random-access memory (DRAM), static random-access memory (SRAM). The one or more routines may be executed by the processor to perform steps for determining a position 21 of the communication device 12 within the first vehicle 14 based on signals received by the controller circuit 18 from the detection module 16 as described herein. In an example, the detection module 16 includes the controller circuit 18 (i.e., the controller circuit 18 is integral to the detection module 16 electrical packaging). In another example, the detection module 16 and the controller circuit 18 are separate devices. The detection module 16 and the controller circuit 18 may also be included in the communication device 12, as will be described in more detail below.

The first antenna 20 is configured to receive first electromagnetic signals 22 (i.e., radio frequency signals) from a first plurality of antennae 24 located within an interior of a first vehicle 14, and is further configured to receive second electromagnetic signals 23 from a second plurality of antennae 25 located within an interior of a second vehicle 15. That is, when the detection device 10 is located within the interior of the first vehicle 14, the first antenna 20 receives the first electromagnetic signals 22. When the detection device 10 is located within the interior of the second vehicle 15, the first antenna 20 receives the second electromagnetic signals 23. The first antenna 20 is a three dimensional antenna to more accurately detect the first and second electromagnetic signals 22, 23 regardless of the orientation of the detection module 16. That is, the three dimensional antenna enables the detection module 16 to calculate a geometric average of the strength of the first and second electromagnetic signals 22, 23 so that the strength is not affected by the orientation of the detection module 16.

The detection module 16 is configured to receive the first and second electromagnetic signals 22, 23 broadcast from the first and second plurality of antennae 24, 25 and to communicate a signal strength to the communication device 12 through a transmission link having standard wireless and/or wired interfaces, such as BLUETOOTH®, Wi-Fi, NFC, universal serial bus (USB), Apple Lightning, universal asynchronous receiver/transmitter (UART), etc. Any detection module 16 suitable to receive the first and second electromagnetic signals 22, 23 and communicate with the communication device 12 may be used. One such detection module 16 is the ATA5700/ATA5702 from Atmel Corporation of San Jose, Calif., USA.

The controller circuit 18 is further communicatively coupled with a second antenna 26. The second antenna 26 is configured to transmit and receive third electromagnetic signals 28 (i.e., radio frequency signals) between the controller circuit 18 and a first transceiver 30 located on the first vehicle 14, and is configured to transmit and receive fourth electromagnetic signals 29 between the controller circuit 18 and a second transceiver 31 located on the second vehicle 15. The first and second transceiver 30, 31 may be any transceiver suitable communicate with the second antenna 26. One such transceiver is the ATA5831/2/3 transceiver from Atmel Corporation of San Jose, Calif., USA. The at least one controller circuit 18 is further configured to transmit communications (e.g., RSSI Values, authorization/authentication signals, challenge response, vehicle control functions, etc.) through the second antenna 26 to the first vehicle 14 and the second vehicle 15 based on the first and second electromagnetic signals 22, 23 received by the first antenna 20. In the example illustrated in FIG. 1, the second antenna 26 is configured to broadcast high frequency radio signals in frequency bands of 315 MHz, 433 MHz, 868 MHz, and 915 MHz.

The first and second plurality of antennae 24, 25 are configured to broadcast first and second electromagnetic signals 22, 23 (i.e., radio frequency signals) from a first transmitter 32, and a second transmitter 33, respectively. In some examples, the first plurality of antennae 24 are configured to transmit low frequency radio signals in a frequency band of about 125 kHz (i.e., 100 kHz-150 kHz), such as those transmitted from a Passive Entry Passive Start system (PEPS system) that may be installed on the first and second vehicle 14, 15. In some examples, the first and second plurality of antennae 24, 25 are configured to transmit high frequency radio signals in a frequency band of about 315 MHz (i.e., 260 MHz-470 MHz), such as those transmitted from a Remote Keyless Entry system (RKE system). In the example illustrated in FIG. 1, the first and second plurality of antennae 24, 25 are installed in the first and second vehicle 14, 15 as part of the PEPS system. Transmission of the low frequency radio signals may be advantageous because the low frequency radio signals in the above mentioned low frequency band are able to pass through a human body with little to no distortion (i.e., attenuation), thereby increasing an accuracy of detecting the first and second electromagnetic signal 22, 23 from the first and second plurality of antennae 24, 25, the advantage of which will become evident in the following paragraphs.

Figure 2:
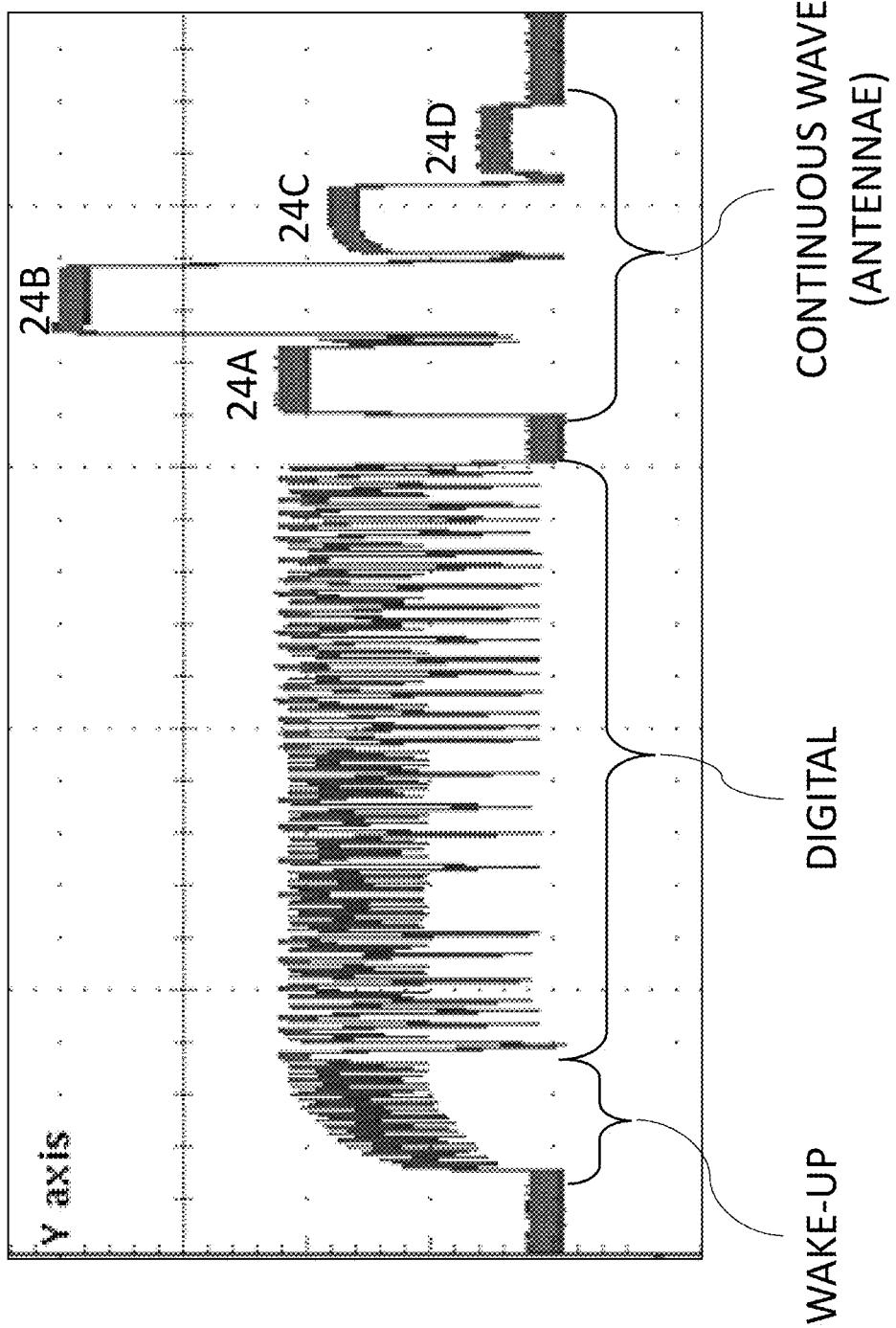
FIG. 2 is an illustration of a localization protocol broadcast by a vehicle of FIG. 1 in accordance with one embodiment.

The first and second transmitter 32, 33 may be any transmitter suitable to broadcast the first and second electromagnetic signals 22, 23. In an example, the first and second transmitter 32, 33 are a component of the PEPS system and/or the RKE system. The first and second transmitter 32, 33 may be capable of transmitting both digital and continuous wave (i.e., analog) radio signals to the first and second plurality of antennae 24, 25. One such device is the ATA5291, marketed as a PEPS Driver and Immobilizer Base Station, from Atmel Corporation of San Jose, Calif., USA. In an example, the first and second transmitter 32, 33 may be programmed to transmit a localization protocol (i.e., a digital message) including a preamble, a vehicle specific or universal wake-up ID, and a data field that designates the message is a system broadcast from the first or second plurality of antennae 24, 25. The digital message may be followed by a continuous wave broadcast from each of the first or second plurality of antennae 24, 25. An example of a digital and continuous wave transmission is shown in FIG. 2. As illustrated in FIG. 2, the continuous wave portion of the broadcast represents Received Signal Strength Indicator values 36 (RSSI values 36) (not shown) of the radio signals detected by the detection module 16. The radio signals are broadcast from four antennae (24A-24D) that are distributed about the interior of the first and second vehicle 14, 15. The RSSI values 36 are a measurement of the power present in the received radio signal. Larger RSSI values 36 indicate stronger received radio signals and are inversely related to a distance between the signal source (i.e. the broadcasting antenna) and the detection module 16. That is, the stronger the detected radio signal (i.e., the larger RSSI value 36), the shorter the distance between the broadcasting antenna and the detection module 16.

As set forth above, in some examples, the detection device 10 may utilize an existing first and second plurality of antennae 24, 25 from the PEPS system and/or the RKE system installed on the first and second vehicle 14, 15 to generate RSSI values 36, which may be used to determine a location of a user, such as a driver of an automobile. In some examples, utilizing the existing first and second plurality of antennae 24, 25 associated with the PEPS system and/or the RKE system may be advantageous in comparison with other techniques for determining the position 21 of the communication device 12 within the first and second vehicle 14, 15, because little or no modifications to an existing vehicle are required to determine the position 21 of the communication device 12.

In other examples, other transmitters transmit signals to other plurality of antennae located within the interior of the first and second vehicle 14, 15 that employ other wireless protocols to generate the RSSI values 36. Examples of other wireless protocols include BLUETOOTH®, Wi-Fi, ultra-wide band (UWB), or near field communication (NFC) and may utilize antennae specific to the frequency band of transmission. In an example, the first and second transmitter 32, 33 transmit high frequency radio signals having the frequency band of about 2.4 GHz that are typically used by wireless local area networks (WLAN). In another example, the first and second transmitter 32, 33 transmit high frequency radio signals having the frequency band of about 5.9 GHz that are typically used by an intelligent transportation systems (ITS) band of Wi-Fi.

Figure 3:
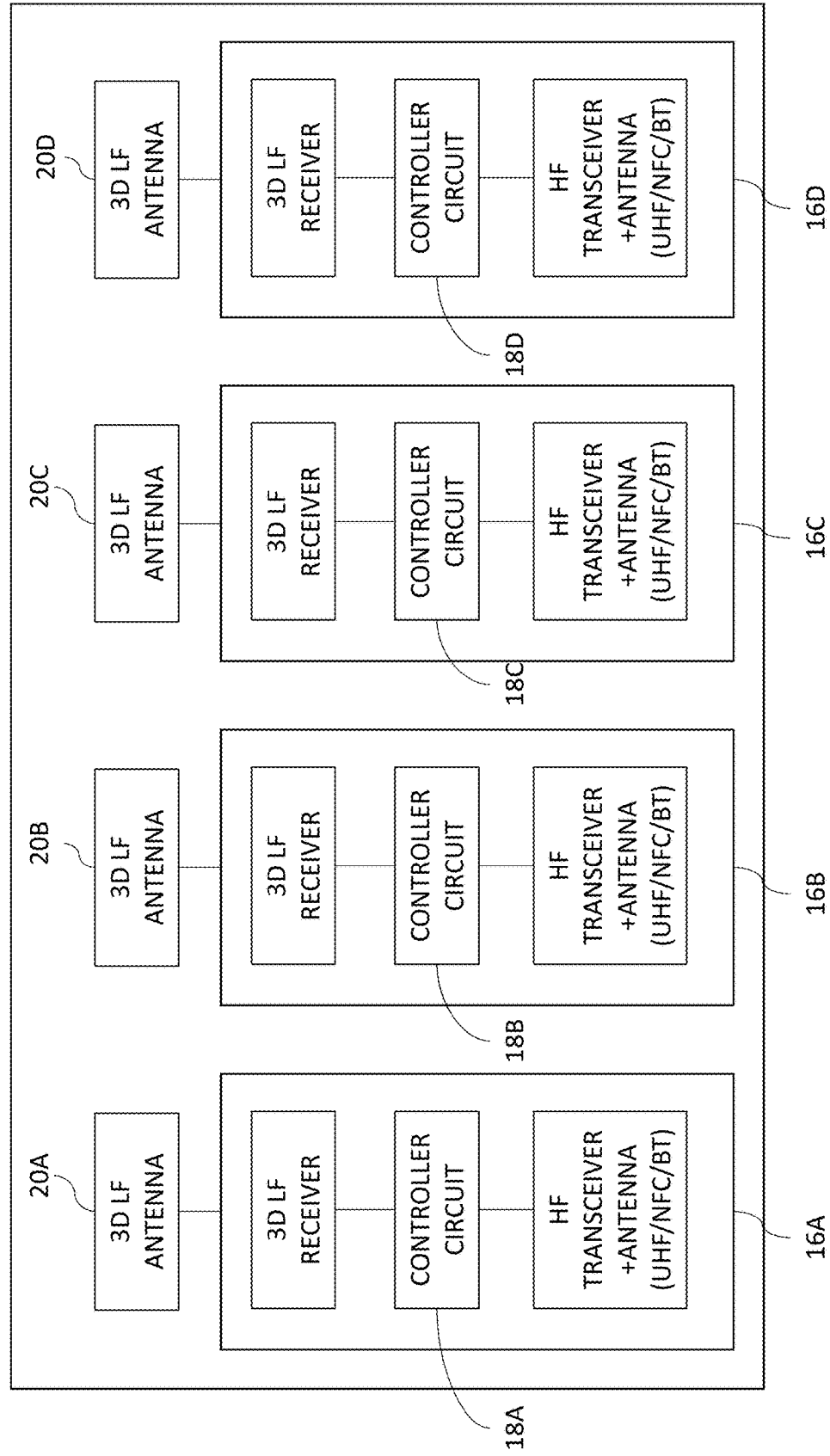
FIG. 3 is an illustration of a detection device in accordance with another embodiment.
Figure 4:
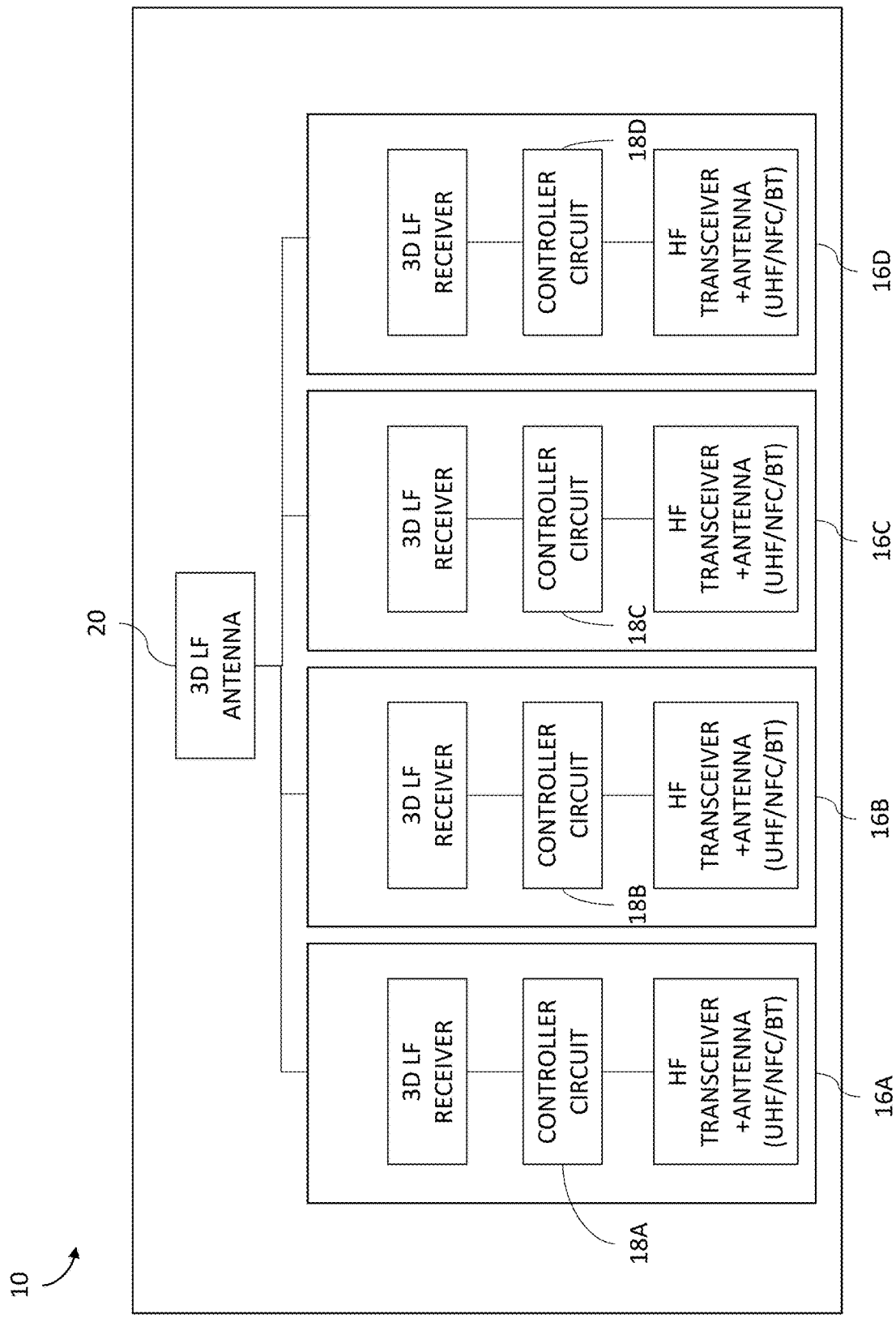
FIG. 4 is an illustration of a detection device in accordance with yet another embodiment.

FIGS. 3 and 4 illustrate examples where the detection device 10 includes a plurality of detection modules 16. In these examples, each of the detection modules 16A-16D is configured (i.e., programmed, paired, etc.) to communicate with a separate vehicle. That is, detection module 16A is configured to communicate with the first vehicle 14, detection module 16B is configured to communicate with the second vehicle 15, detection module 16C is configured to communicate with a third vehicle (not shown), and detection module 16D is configured to communicate with a fourth vehicle (not shown). It will be appreciated that any number of detection modules 16 may be included in the detection device 10, limited by, among other things, packaging space and user preference. In the example illustrated in FIG. 3, each of the plurality of detection modules 16A-16D are communicatively coupled with a separate first antenna 20A-20D. This example may provide the benefit of using components that may be fabricated with the first antenna 20 included in the detection module 16 package. In the example illustrated in FIG. 4, each of the plurality of detection modules 16A-16D are communicatively coupled with the same first antenna 20. This example may provide the benefit of reducing components, thereby reducing cost and complexity of the package.

Figure 5:
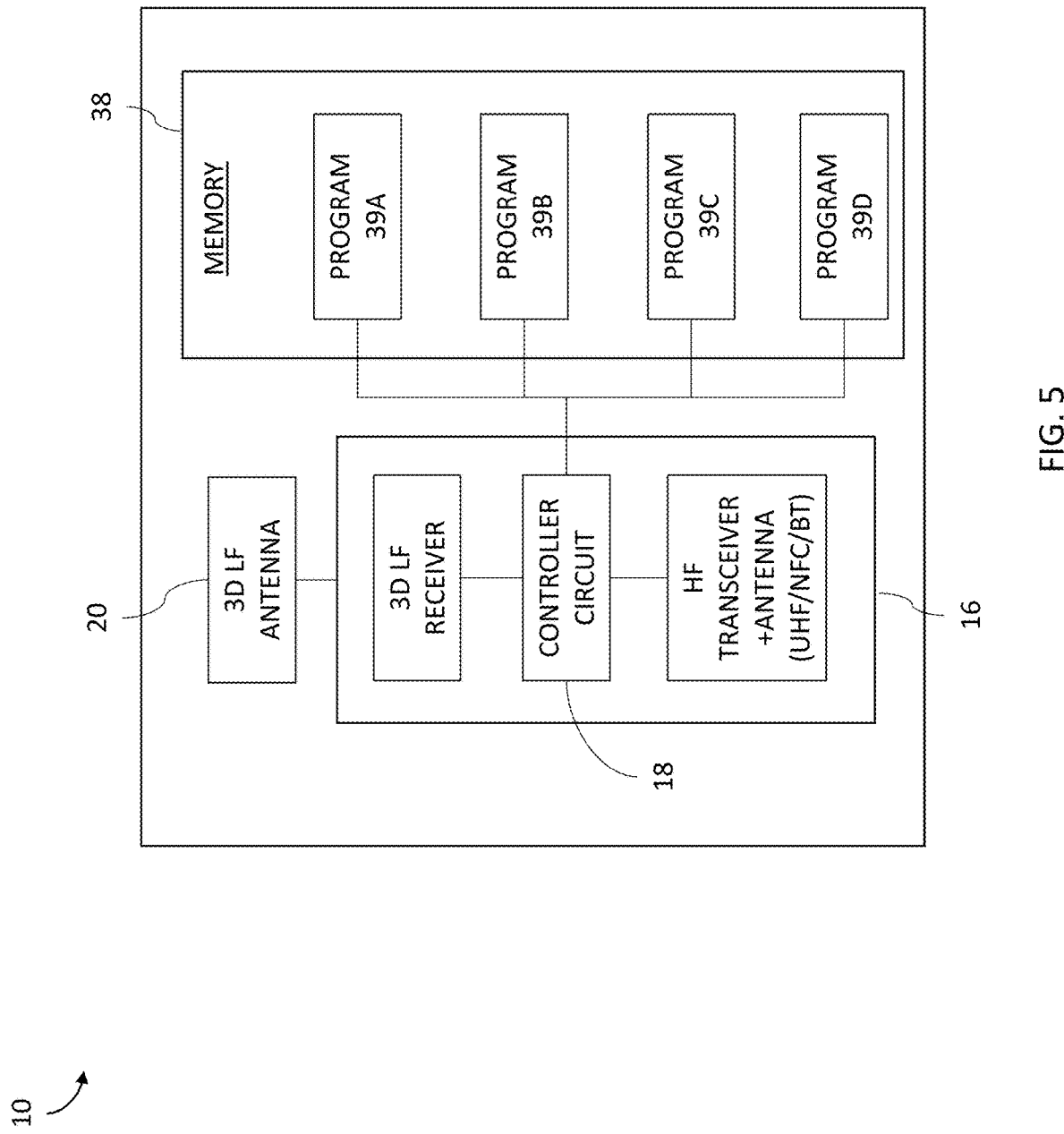
FIG. 5 is an illustration of a detection device in accordance with yet another embodiment.

FIG. 5 illustrates an example where the single detection device 16 that is communicatively coupled with the first antenna 20, further includes a memory 38 communicatively coupled with the controller circuit 18. In this example, the memory 38 includes a plurality of programs 39A-39D associated with each of the first vehicle through the fourth vehicle. This example may provide the benefit of further reducing components, with a trade-off of increased memory capacity. The memory 38 may be programmed to associate any number of vehicles, limited by the memory capacity. In one example, the process of programming and reprogramming the memory for the plurality of vehicles is conducted by a service technician that has access to security protocols associated with each of the plurality of vehicles. In another example, the process of programming and reprogramming the memory for the plurality of vehicles is conducted by a user of the plurality of the vehicles, such as a fleet operator and/or an owner of the plurality of the vehicles.

Figure 10B:
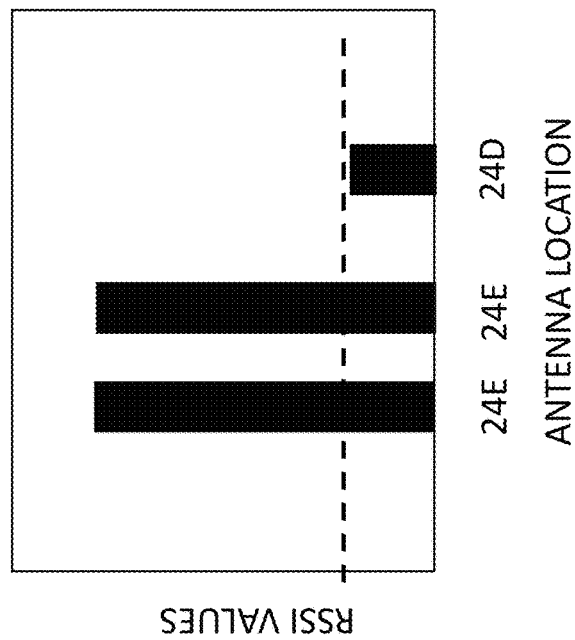
FIG. 10B is a plot of received signal strength indicator values from the vehicle in FIG. 10A in accordance with one embodiment.

For illustration purposes only, the first vehicle 14 will be used to describe the following examples of the application of the detection device 10. It will be understood that the application of the detection device 10 will also apply to the second vehicle 15, and/or the plurality of vehicles. The detection device 10 is configured such to perform localization of the communication device 12 in the first vehicle 14 with the antenna arrangement described and shown with respect to FIG. 8A, as well as the second vehicle 15 with the antenna arrangement shown in FIG. 8A. In another example, the detection device 10 is configured such to perform localization in the first vehicle 14 with the antenna arrangement described and shown with respect to FIG. 8A, as well as the second vehicle 15 with the antenna arrangement shown in FIG. 10. The detection device 10 described herein may be used to localize the communication device 12 in multiple vehicles with various antenna configurations, whether the antenna configurations are the same, or different, between the multiple vehicles.

Figure 6:
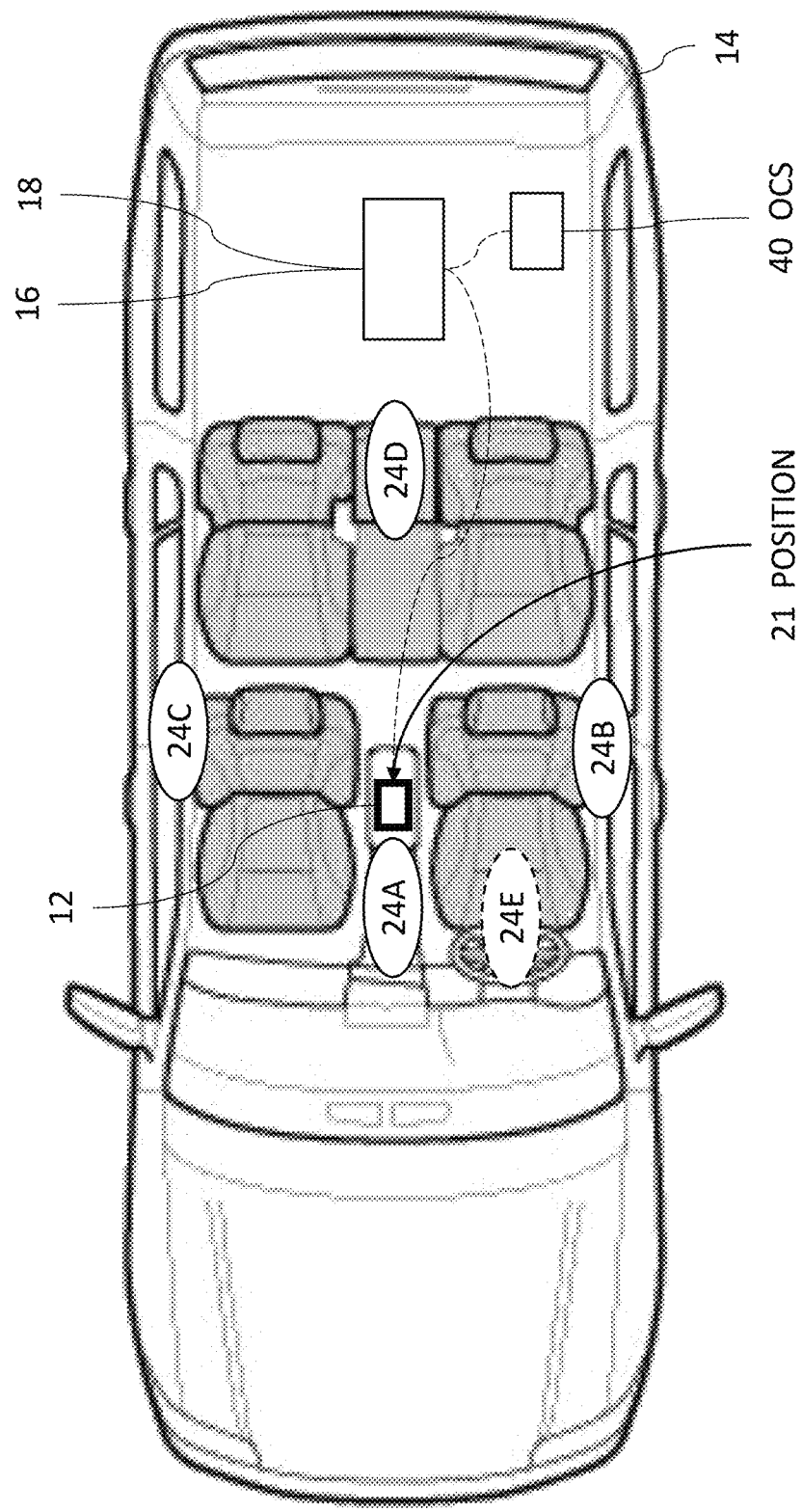
FIG. 6 is an illustration of the detection device of FIG. 1 installed in a vehicle in accordance with one embodiment.

FIG. 6 illustrates an example of the first plurality of antennae 24 (denoted as 24A-24E) with locations distributed about the interior of the first vehicle 14, and, in the example of FIG. 6, the communication device 12 is located on a front center console of the first vehicle 14. It will be appreciated that additional antennae beyond antennae 24A-24E depicted in the example of FIG. 6 may exist within the first vehicle 14 that may be associated with the PEPS system and/or the RKE system (e.g., arranged proximate a trunk or a rear hatch of the first vehicle 14). In the example of FIG. 6, the first plurality of antennae 24 include at least one antenna 24A arranged proximate the front center console of the first vehicle 14, at least one antenna 24B arranged proximate a driver side door (e.g., proximate an exterior door handle or B-pillar), at least one antenna 24C arranged proximate a front passenger side door, and at least one antenna 24D arranged proximate a rear seat of the first vehicle 14. In an example where the first vehicle 14 does not include the front center console, antenna 24A may be arranged proximate a center of a lower dash of the first vehicle 14. In an optional example, the first plurality of antennae 24 include at least one antenna 24E arranged proximate a steering wheel of the first vehicle 14, such as beneath a headliner of the vehicle's 14 interior trim, or below a driver's seat to more accurately detect the position 21 of the communication device 12 relative to the first plurality of antennae 24. In an example, antennae 24A and 24B may be omitted from the system and replaced by antenna 24E, reducing both cost and complexity of the system.

Figures 7A, 7B:
FIG. 7A is an illustration of a broadcast sequence from the vehicle of FIG. 6 in accordance with one embodiment.
FIG. 7B is an illustration of another broadcast sequence from the vehicle of FIG. 6 in accordance with one embodiment.

The controller circuit 18 is configured to determine the position 21 of the communication device 12 within the interior of the first vehicle 14 relative to the locations of the first plurality of antennae 24. The controller circuit 18 determines the position 21 based on the first electromagnetic signals 22 broadcast from each of the antennae 24A-24D using the RSSI values 36. In order for the controller circuit 18 to determine the position 21 of the communication device 12, the controller circuit 18 must associate the detected first electromagnetic signal 22 with a specific antenna location. In an example, the first transmitter 32 transmits the first electromagnetic signals 22 to the first plurality of antennae 24 in a defined broadcast sequence 40. The detection module 16 determines an identity of each of the antennae 24A-24D based on the defined broadcast sequence 40 that is also stored in the memory of the controller circuit 18. For example, the broadcast sequence 40 includes transmitting a first radio signal to the antenna 24A, a second radio signal to antenna 24B, a third radio signal to antenna 24C, and a fourth radio signal to antenna 24D. The broadcast sequence 40 is repeated at a regular time interval (every 10 seconds, for example) so that the position 21 of the communication device 12 may be determined as the communication device 12 may be moved about the first vehicle 14 while the first vehicle 14 is in use and/or moving. Strategies to determine the start of the broadcast sequence 40 may include two broadcasts from antenna 24A at the beginning of each repeated broadcast sequence 40. An example of the broadcast sequence 40 is shown in FIG. 7A. Another example of the broadcast sequence 40, where an optional antenna 24E replaces antennae 24 and 24B, is shown in FIG. 7B.

Figure 8B:
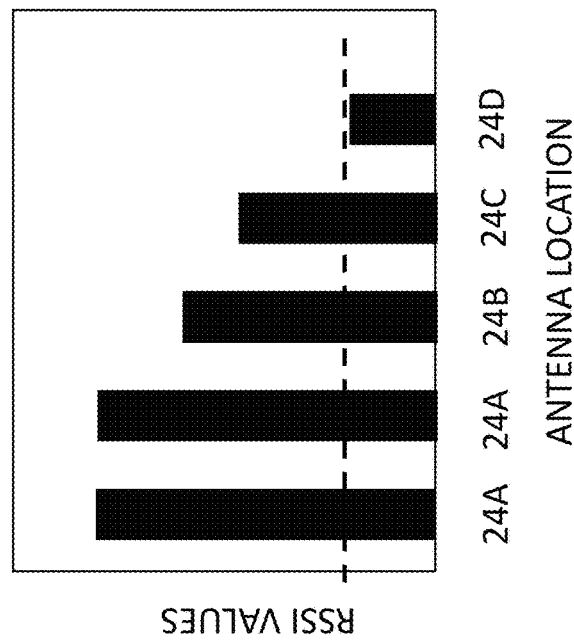
FIG. 8B is a plot of received signal strength indicator values from the vehicle in FIG. 8A in accordance with one embodiment.
Figure 8A:
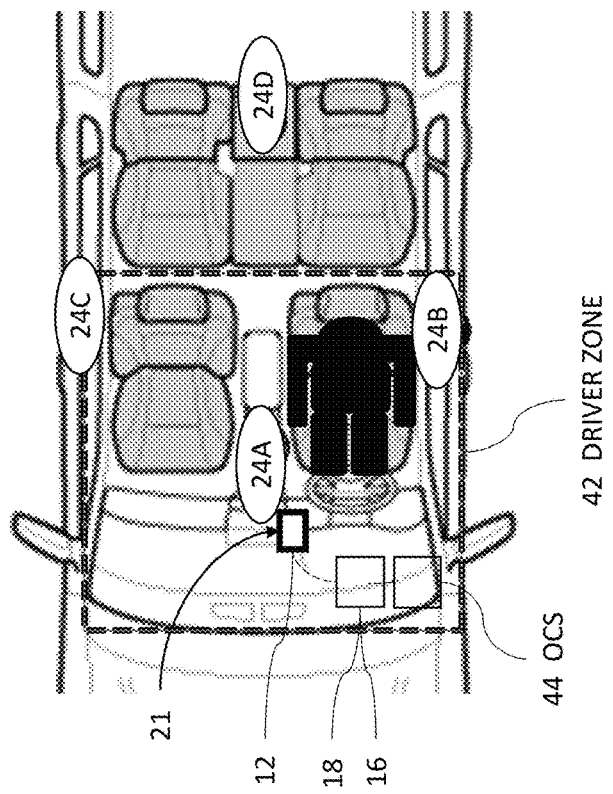
FIG. 8A is an illustration of a driver zone within the interior of the vehicle of FIG. 6 in accordance with one embodiment.

FIG. 8A illustrates an example of a driver zone 42 within the interior of the first vehicle 14. In this example, the operator is occupying the driver's seat, the front passenger seat is unoccupied, and the communication device 12 is on a front dash of the first vehicle 14 in front of the operator. The controller circuit 18 is in further communication with a vehicle controller (not shown) and further determines whether the front passenger seat is occupied based on a signal received from an occupant classification system 44

(OCS 44) installed in the first vehicle 14. In some examples, the vehicle controller communicates the signal from the OCS 44 to the controller circuit 18. In other examples, the OCS 44 communicates the signal to the controller circuit 18. The OCS 44 detects a presence of a passenger. In some examples, the OCS 44 detects a passenger's approximate weight. In some examples, the OCS 44 detects the front seat passenger's seating position. In some examples, the OCS 44 detects the presence of the passenger using a pressure-based system installed in the passenger seat. In other examples, the OCS 44 detects the passenger using a camera-based system, that may also include thermal imaging to determine whether the passenger is a living being. The OCS 44 may adjust an inflation force of a passenger side air bag (i.e., supplemental restraint) based on the classification of the occupant. The driver zone 42 defines an area within a reach of the driver and includes at least the driver seat and the front passenger seat, as illustrated by the dashed outline in FIG. 8A. When the communication device 12 is within the driver zone 42 (i.e., accessible to the operator), an ability to use the communication device 12 may distract the operator while driving the first vehicle 14. It will be appreciated that distracted driving is dangerous, claiming thousands of lives on roadways around the world each year.

The controller circuit 18 further determines whether the position 21 of the communication device 12 is within the driver zone 42 based on the RSSI values 36. FIG. 8B illustrates the RSSI values 36 determined by the controller circuit 18 from the example illustrated in FIG. 8A. As shown in FIG. 8B, at position 21, the detection module 16 detected the first electromagnetic signals 22 from antenna 24A has substantially larger RSSI values 36 than the first electromagnetic signals 22 from antenna 24D. The controller circuit 18 determines that the position 21 of the communication device 12 is within the driver zone 42 when the RSSI values 36 of at least one antenna arranged in the front portion of the interior of the first vehicle 14 are greater than the RSSI values 36 of at least one antenna arranged in the rear portion of the interior of the first vehicle 14. That is, the controller circuit 18 determines that the communication device 12 is located in the front (driver or passenger seat) of the first vehicle 14, and is therefore within the defined driver zone 42. As a result of determining that the communication device 12 is within the defined driver zone 42, the controller circuit 18 may inhibit the use of one or more functions of the communication device 12, as will be described in more detail below.

FIGS. 8A and 8B depict an example in which the driver zone 42 is defined to include an area surrounding both the front driver and passenger seats in the first vehicle 14. The example of FIGS. 8A and 8B may be advantageous, because it enables the detection of the communication device 12 within the reach of the operator (e.g., driver), and inhibiting one or more functions of communication device 12 to avoid dangerous distraction of the operator. In some cases, the example depicted in FIGS. 8A and 8B may be undesirable for a passenger travelling in the passenger seat of the first vehicle 14, because, although the passenger does not need to actively pay attention to the task of operating the first vehicle 14, the passenger's communication device (not depicted in FIG. 8A) may be disabled just like the communication device 12 of the driver.

Figure 9B:
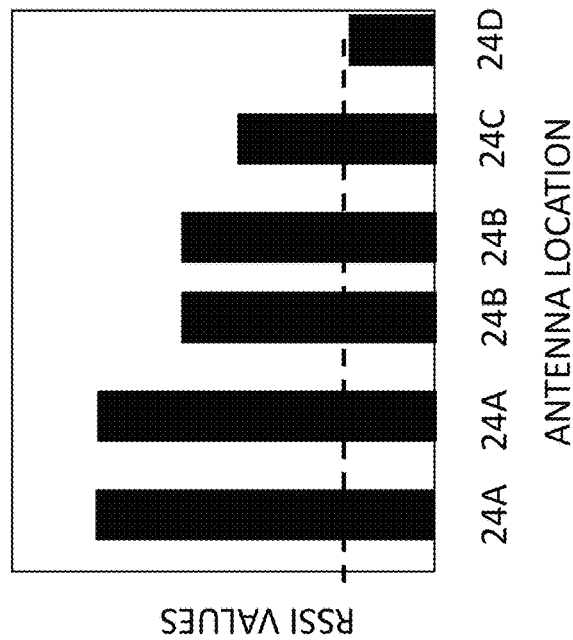
FIG. 9B is a plot of the received signal strength indicator values from the vehicle in FIG. 9A in accordance with one embodiment.
Figure 9A:
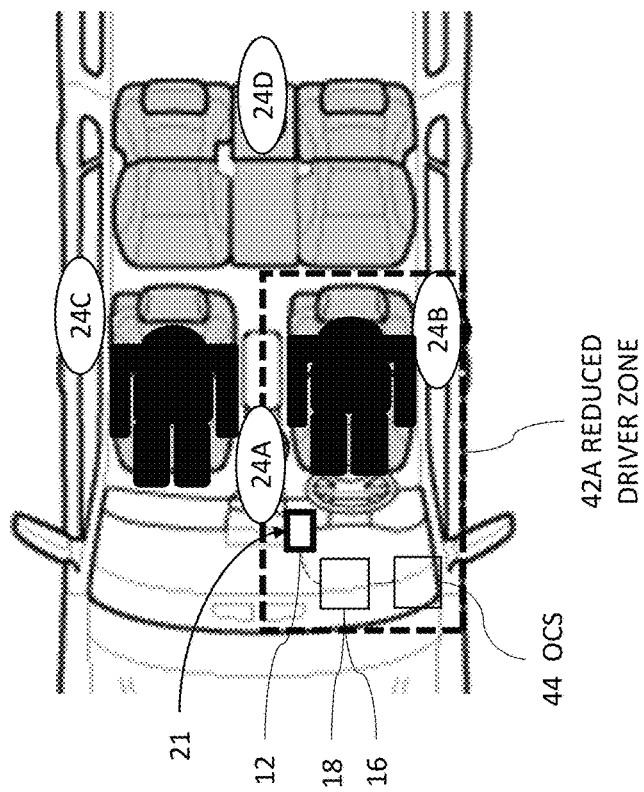
FIG. 9A is another illustration of a driver zone within the interior of the vehicle in accordance with one embodiment.

FIG. 9A depicts one example in which the system is configured to reduce a driver zone 42 within the interior of the first vehicle 14 based on detection of a passenger in the passenger seat of the first vehicle 14. In this example, the operator is occupying the driver's seat, a passenger is occupying the front passenger seat, and the communication device 12 is on the front dash of the first vehicle 14 in front of the operator. The controller circuit 18 determines that the front passenger seat is occupied based on the signal received from the OCS 44 as described above. As shown in the example of FIG. 9A, the system may create a reduced driver zone 42A by additionally comparing the relative RSSI values 36 associated with antennae 24B and 24C. For example, FIG. 9B illustrates the RSSI values 36 determined by the controller circuit 18 from the example illustrated in FIG. 9A. As shown in FIG. 9B, at position 21, the detection module 16 detected the first electromagnetic signals 22 from antennae 24A has substantially larger RSSI values 36 than the first electromagnetic signals 22 from antenna 24D. The controller circuit 18 determines that the communication device 12 is located in the front (driver or passenger seat) of the first vehicle 14. The controller circuit 18 further determines that the first electromagnetic signals 22 from antenna 24B has substantially larger RSSI values 36 than the first electromagnetic signals 22 from antenna 24C, and is therefore within the reduced driver zone 42A. As a result of determining that the communication device 12 is within the reduced driver zone 42A, the controller circuit 18 may inhibit the use of one or more functions of the communication device 12, as will be described in more detail below.

It will be appreciated that the system differentiates between the communication device 12 that is within the reduced driver zone 42A and another communication device (not shown) that may be in use by the front passenger. In an example where the front passenger is using another communication device, the RSSI values 36 of antenna 24C will be substantially greater than the RSSI values 36 of antenna 24B. In this example, the controller circuit 18 may not inhibit the use of one or more functions of one or more other communication devices (e.g., the passenger's communication device).

Figure 10A:
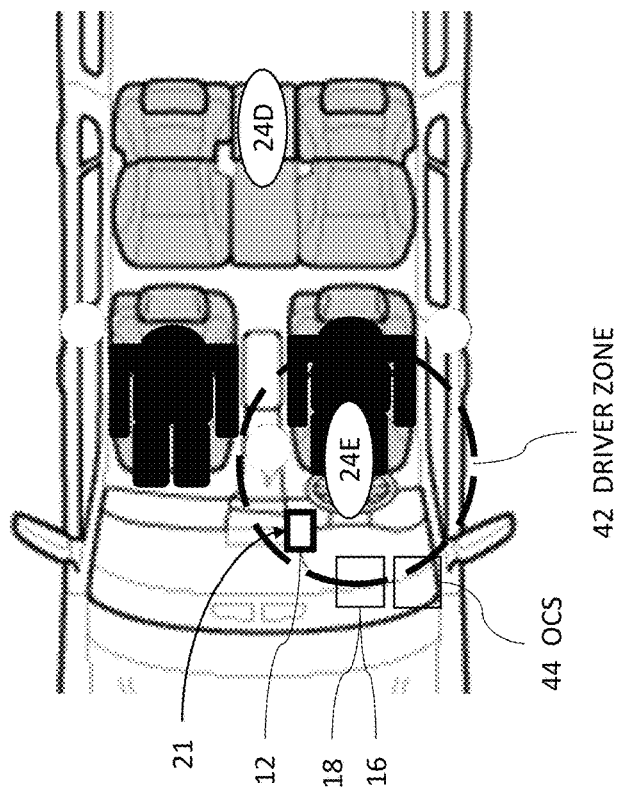
FIG. 10A is an illustration of another driver zone within the interior of the vehicle of FIG. 6 in accordance with one embodiment.
Figure 11D:
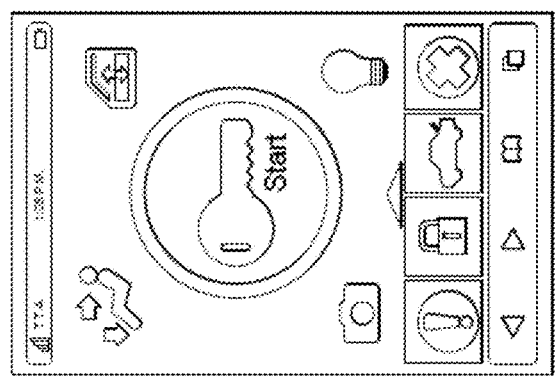
FIG. 11D is an illustration of another graphical user interface of the detection device of FIG. 1 with key fob functions integrated into a mobile phone display in accordance with one embodiment.
Figure 11C:
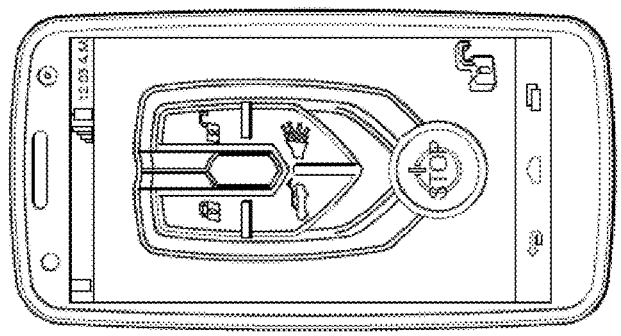
FIG. 11C is an illustration of a graphical user interface of the detection device of FIG. 1 with key fob functions integrated into a mobile phone display in accordance with one embodiment.
Figure 11A:
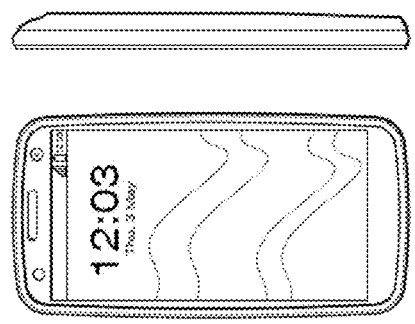
FIG. 11A is an illustration of the detection device of FIG. 1 with key fob functions integrated into a back side of a mobile phone in accordance with one embodiment.
Figure 11B:
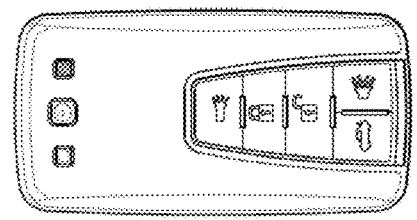
FIG. 11B is an illustration of the detection device of FIG. 1 with key fob functions integrated into an accessory of the mobile phone in accordance with one embodiment.

FIG. 10A illustrates an example where the optional antenna 24E replaces antennae 24A and 24B, and the broadcast sequence 40 is that of FIG. 7B. As in FIG. 9A, the operator is occupying the driver's seat, the passenger is occupying the front passenger seat, and the communication device 12 is on the front dash of the first vehicle 14 in front of the operator. The controller circuit 18 determines that the position 21 of the communication device 12 is within the driver zone 42 when the RSSI value 36 of the first electromagnetic signals 22 from antennae 24E is greater than the RSSI value 36 of the first electromagnetic signals 22 from antenna 24D.

In an example, the controller circuit 18 determines that the position 21 of the communication device 12 is within the driver zone 42 when the RSSI value 36 of the first electromagnetic signals 22 from antennae 24E is greater than a threshold. In this example, antenna 24D may be omitted from the determination of the position 21 of the communication device 12. The threshold may be user defied and may be established based on dimensions and layout of the interior of the first vehicle 14. It will be appreciated that when the single antenna 24E is used to determine the position 21 of the communication device 12, a spherical detection zone may be defined around antenna 24E, and a radius of the spherical detection zone is defined by the threshold.

Referring back to FIG. 9B, in an example, when the OCS 44 determines the front passenger seat is occupied, the vehicle controller requests the first transmitter 32 to repeat the transmission of the first electromagnetic signals 22 from antenna 24B as an indication to the controller circuit 18 that the front passenger seat is occupied. The controller circuit 18 uses this indication as a trigger event to reduce the driver zone 42 (i.e., the reduced driver zone 42A), as illustrated by the dashed outline in FIG. 9A.

In another example, the first vehicle 14 is not equipped with the OCS 44 and the system is unable to determine whether a passenger is occupying the front passenger seat. In this example, the system defines the reduced driver zone 42A as illustrated in FIG. 9A, and employs the same logic for determining whether the communication device 12 is within the reduced driver zone 42A as described above for FIG. 9B.

The controller circuit 18 is further configured to restrict a function of the communication device 12 based on the position 21 of the communication device 12 within the first vehicle 14. When the controller circuit 18 determines that the communication device 12 is within the driver zone 42 or within the reduced driver zone 42A, the controller circuit 18 enables a driving mode 46 of the communication device 12 to reduce the occurrence of distracted driving. The driving mode 46, also referred to as a "do not disturb while driving" setting of the communication device 12, disables specific functions of the communication device 12, such as short message service (SMS—i.e. text messaging), and/or incoming phone calls. Other features may be restricted based on the manufacturer's settings for the communication device 12 and/or based on elections by the user of the communication device 12.

As described above, the controller circuit 18 enables the driving mode 46 of the communication device 12 based on the determination that the communication device 12 is within the driver zone 42. In another example, the controller circuit 18 enables the driving mode 46 when the communication device 12 is within the driver zone 42 while the first vehicle 14 is moving, and disables the driving mode 46 when the communication device 12 is within the driver zone 42 while the first vehicle 14 is stopped. In an example, the controller circuit 18 determines that the first vehicle 14 is moving based on signals from an inertial measurement unit (IMU—not shown) that is installed in the communication device 12. In another example, the controller circuit 18 determines that the first vehicle 14 is moving based on signals from an IMU that is installed in the first vehicle 14. The typical IMU includes a three dimensional (3D) accelerometer, a 3D gyroscope, and a 3D magnetometer to detect motion. In yet another example, the controller circuit 18 determines that the first vehicle 14 is moving based on signals from the vehicle controller that is in communication with a wheel speed sensor mounted to a wheel of the first vehicle 14.

FIGS. 11A-11D illustrate examples of the detection device 10 integrated with the communication device 12. In an example, the detection module 16 is installed within in the communication device 12 and may be powered by the battery of the communication device 12. Installing the detection module 16 within the communication device 12 may be beneficial by inhibiting the operator from disabling the system. Other benefits of installing the detection module 16 within the communication device 12 include ease of use by the user, manufacturing efficiencies, and a lower cost of packaging compared to a separate device. In another example, the detection module 16 is installed in a battery of the communication device 12 and may be powered by the battery of the communication device 12. In yet another example, the detection module 16 is installed in an accessory of the communication device 12, such as a protective case, a camera module, etc, and may be powered by the battery of the communication device 12. In yet another example, the detection module 16 is installed in a docking station of the communication device 12 that may be connected to the first vehicle's 14 infotainment system.

According to the examples described above, where the detection module 16 is included as part of the communication device 12 and/or is part of an accessory of communication device 12, to prevent the user from defeating the restriction of functions by removing or disabling the detection module 16, an operating system of the communication device 12 may default to the driving mode 46 when the detection module 16 is not present and/or disabled.

It will be appreciated that in some vehicle installations, the locations of the first plurality of antennae 24 may not allow for a symmetric placement of opposing antennae. For example, antenna 24B may be located closer to a front of the first vehicle 14 compared to the location of antenna 24C. In these examples of non-symmetrical antennae installation, the system either increases or decreases a drive current for the low frequency first electromagnetic signals 22 to equalize the first electromagnetic signals 22 at a desired boundary of the driver zone 42 and/or the reduced driver zone 42A.

Referring again to FIG. 9A, the first plurality of antennae 24 are symmetrically placed within the first vehicle 14. In an example, the boundary of the reduced driver zone 42A is desired to be adjusted to create a larger area (e.g., to include all of the front center console). The boundary of the reduced driver zone 42A may be adjusted by adding a multiplier value to the RSSI values 36 of a particular antenna. For example, a multiplier value of 1.2 may be applied to the RSSI values 36 from antenna 24B to increase a width of the reduced driver zone 42A by twenty percent. The controller circuit 18 applies the multiplier value to a decision logic to determine whether the communication device 12 is within the adjusted reduced driver zone 42A.

According to the examples described above, where the detection module 16 is included as part of communication device 12 and/or is part of an accessory of communication device 12 (e.g., a case or battery), the detection module 16 may be used not only for determining the relative position 21 of communication device 12 within the first vehicle 14 (and for the plurality of vehicles) as described herein, the detection module 16 may also be used to perform functionality of a PEPS and/or RKE device (e.g., a key fob). That is, the detection module further includes RKE functions and/or includes PEPS functions for the plurality of vehicles. For example, the detection module 16 may be configured to receive the low frequency first electromagnetic signals 22 to determine whether or not to unlock the first and/or second vehicle 14, 15, remotely start the engine of the first and/or second vehicle 14, 15, or other functionality typically associated with a remote key fob. In an example, the first transceiver 30 in the first vehicle 14 is configured to receive the third electromagnetic signals 28 from a remote keyless entry (RKE) system located in the detection device 10, and the second transceiver 31 in the second vehicle 15 is configured to receive the fourth electromagnetic signals 29 from the remote keyless entry (RKE) system located in the detection device 10. In another example, the first plurality of antennae 24 are further configured to transmit the first electromagnetic signals to a passive entry passive start (PEPS) system located on the detection device 10, and the second plurality of antennae 25 are further configured to transmit the second electromagnetic signals 23 to the passive entry passive start (PEPS) system located on the detection device 10. In addition, in examples where the detection module 16 is installed in the communication device 12, installed in the battery of the communication device 12, and/or installed in an accessory of communication device 12, the communication device 12 can serve a dual purpose, replacing the key fob and/or also allowing for localization of communication device 12 for the plurality of vehicles.

Figure 12:
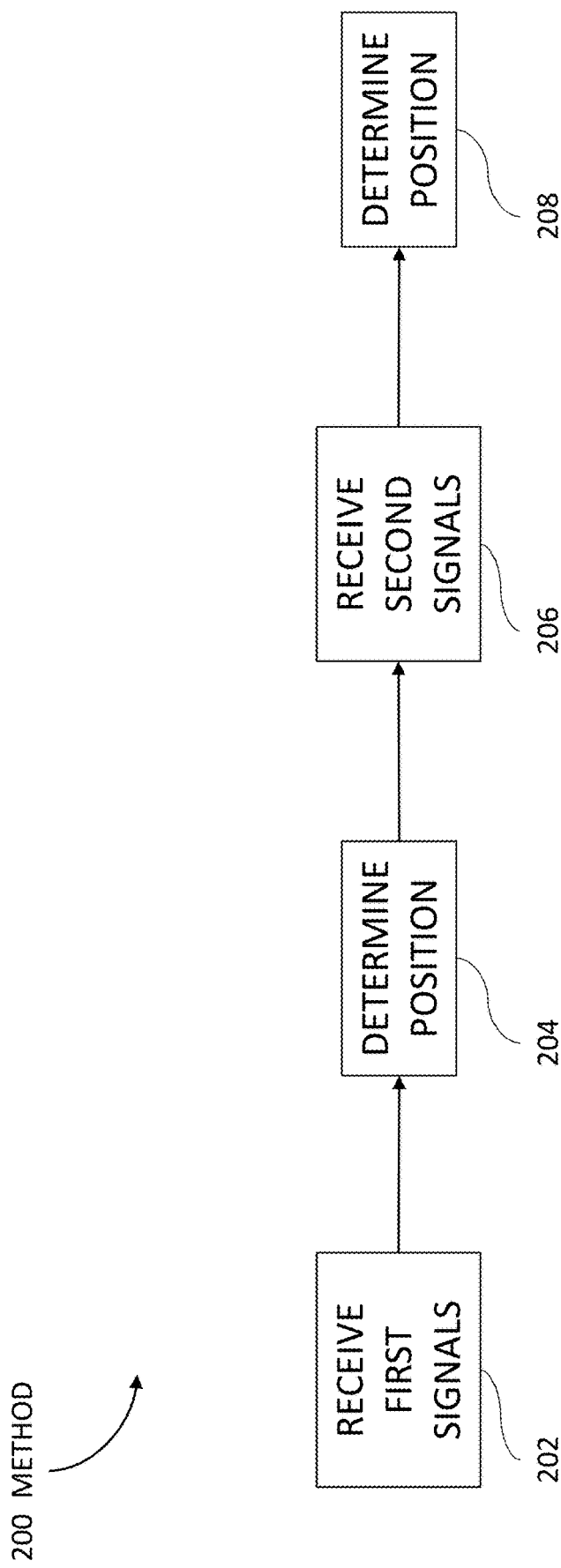
FIG. 12 is a flow chart illustrating a detection method in accordance with another embodiment.

FIG. 12 is a flow chart illustrating another example of a method 200 of operating a detection device 10.

Step 202, RECEIVE FIRST SIGNALS, includes receiving the first electromagnetic signals 22 from the first plurality of antennae 24 located within an interior of the first vehicle 14 with a first antenna 20, as described above. The detection module 16 is communicatively coupled with the communication device 12, and in an example is installed in the communication device 12. In an example, the detection module 16 further includes PEPS and/or RKE functions for the first vehicle 14 as described above.

Step 204, DETERMINE POSITION, includes determining, with a controller circuit 18 communicatively coupled with the detection module 16 and the communication device 12, a position 21 of the communication device 12 within the interior of the first vehicle 14. The position 21 is based on the first electromagnetic signals 22 and is relative to a location of the communication device 12 with respect to locations of the first plurality of antennae 24, as described above. The controller circuit 18 determines that the position 21 of the communication device 12 is within a driver zone 42 based on RSSI values 36 of the first plurality of antennae 24 as described above. In some examples, the controller circuit 18 reduces the driver zone 42 to exclude a front passenger seat when the front passenger seat is occupied, as described above. In some examples, the controller circuit 18 restricts a function of the communication device 12 based on the position 21 within the first vehicle 14, as described above.

Step 206, RECEIVE SECOND SIGNALS, includes receiving the second electromagnetic signals 23 from the second plurality of antennae 25 located within an interior of the second vehicle 15 with the first antenna 20, as described above. In an example, the detection module 16 further includes PEPS and/or remote keyless entry functions for the second vehicle 15 as described above.

Step 208, DETERMINE POSITION, includes determining, with the controller circuit 18, a position 21 of the communication device 12 within the interior of the second vehicle 15. The position 21 is based on the second electromagnetic signals 23 and is relative to a location of the communication device 12 with respect to locations of the second plurality of antennae 25, as described above. The controller circuit 18 determines that the position 21 of the communication device 12 is within a driver zone 42 based on RSSI values 36 of the second plurality of antennae 25 as described above. In some examples, the controller circuit 18 reduces the driver zone 42 to exclude a front passenger seat when the front passenger seat is occupied, as described above. In some examples, the controller circuit 18 restricts a function of the communication device 12 based on the position 21 within the second vehicle 15, as described above.

Accordingly, a detection device 10 and a detection method 200 are provided. The detection device 10 is an improvement over other detection devices because the detection device 10 determines that the communication device 12 is within the driver zone 42 and may distract the driver, and may be used with multiple vehicles.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Clauses

1. A detection device, comprising:
   at least one detection module communicatively coupled with a communication device;
   the at least one detection module including at least one controller circuit communicatively coupled with a first antenna;
   the first antenna configured to receive first electromagnetic signals from a first plurality of antennae located within an interior of a first vehicle;
   the first antenna further configured to receive second electromagnetic signals from a second plurality of antennae located and within an interior of a second vehicle; wherein
   the at least one controller circuit is configured to determine a position of the communication device within the interior of the first vehicle relative to locations of the first plurality of antennae, based on the first electromagnetic signals received by the first antenna, and determine a position of the communication device within the interior of the second vehicle relative to locations of the second plurality of antennae, based on the second electromagnetic signals received by the first antenna.

2. The detection device of clause 1, wherein the at least one controller circuit is further communicatively coupled with a second antenna;
    the second antenna configured to transmit and receive third electromagnetic signals between the at least one controller circuit and transceivers located on the first vehicle and the second vehicle; wherein
    the at least one controller circuit is further configured to transmit communications to the first vehicle and the second vehicle based on the first electromagnetic signals and the second electromagnetic signals received by the first antenna.

3. The detection device of clause 2, wherein the at least one detection module further includes remote keyless entry (RKE) functions.

4. The detection device of any one of clause 2 to 3, wherein the at least one detection module further includes passive entry passive start (PEPS) functions.

5. The detection device of any one of the preceding clauses, wherein the detection device includes a plurality of detection modules.

6. The detection device of clause 5, wherein each of the plurality of detection modules is communicatively coupled with a separate first antenna.

7. The detection device of any one of clause 5 to 6, wherein each of the plurality of detection modules are communicatively coupled to a same first antenna.

8. The detection device of any one of the preceding clauses, wherein the detection device further includes a memory communicatively coupled with the at least one controller circuit.

9. The detection device of clause 8, wherein the memory has a plurality of programs associated with each of the first vehicle and the second vehicle.

10. The detection device of any one of the preceding clauses, wherein the at least one controller circuit is configured to restrict a function of the communication device based on the position.

11. The detection device of any one of the preceding clauses, wherein the first plurality of antennae are configured to broadcast the first electromagnetic signals from a first transmitter, and the second plurality of antennae are configured to broadcast the second electromagnetic signals from a second transmitter.

12. The detection device of any one of the preceding clauses, wherein the at least one detection module is installed in the communication device.

13. The detection device of any one of the preceding clauses, wherein the at least one detection module is installed in a battery of the communication device.

14. The detection device of any one of the preceding clauses, wherein the at least one detection module is installed in an accessory of the communication device.

15. The detection device of any one of the preceding clauses, wherein the first plurality of antennae are further configured to receive the first electromagnetic signals from a remote keyless entry (RKE) system located in the detection device, and the second plurality of antennae are further configured to receive the second electromagnetic signals from the remote keyless entry (RKE) system located in the detection device.

16. The detection device of any one of the preceding clauses, wherein the first plurality of antennae are further configured to transmit the first electromagnetic signals to a passive entry passive start (PEPS) system located on the detection device, and the second plurality of antennae are further configured to transmit the second electromagnetic signals to the passive entry passive start (PEPS) system located on the detection device.

17. A method of using a detection device, comprising:
    receiving, with a first antenna, first electromagnetic signals from a first plurality of antennae located within an interior of a first vehicle;
        the first antenna communicatively coupled with at least one controller circuit;
            the at least one controller circuit included in at least one detection module;
                the at least one detection module communicatively coupled with a communication device;
    determining, with the at least one controller circuit, a position of the communication device within the interior of the first vehicle relative to locations of the first plurality of antennae, based on the first electromagnetic signals received by the first antenna;
    receiving, with the first antenna, second electromagnetic signals from a second plurality of antennae located and within an interior of a second vehicle; and
    determining, with the at least one controller circuit, a position of the communication device within the interior of the second vehicle relative to locations of the second plurality of antennae, based on the second electromagnetic signals received by the first antenna.

18. The method of clause 17, wherein the at least one controller circuit is further communicatively coupled with a second antenna;
    the second antenna configured to transmit and receive third electromagnetic signals between the at least one controller circuit and transceivers located on the first vehicle and the second vehicle; wherein
    the at least one controller circuit is further configured to transmit communications to the first vehicle and the second vehicle based on the first electromagnetic signals and the second electromagnetic signals received by the first antenna.

19. The method of clause 18, wherein the at least one detection module further includes remote keyless entry (RKE) functions.

20. The method of any one of clause 18 to 19, wherein the at least one detection module further includes passive entry passive start (PEPS) functions.

21. The method of any one of clause 17 to 20, wherein the detection device includes a plurality of detection modules.

22. The method of clause 21, wherein each of the plurality of detection modules is communicatively coupled with a separate first antenna.

23. The method of any one of clause 21 to 22, wherein each of the plurality of detection modules are communicatively coupled to a same first antenna.

24. The method of any one of clause 17 to 23, wherein the detection device further includes a memory communicatively coupled with the at least one controller circuit.

25. The method of clause 24, wherein the memory has a plurality of programs associated with each of the first vehicle and the second vehicle.

26. The method of any one of clause 17 to 25, wherein the at least one controller circuit is configured to restrict a function of the communication device based on the position.

27. The method of any one of clause 17 to 26, wherein the first plurality of antennae are configured to broadcast the first electromagnetic signals from a first transmitter, and the second plurality of antennae are configured to broadcast the second electromagnetic signals from a second transmitter.

28. The method of any one of clause 17 to 27, wherein the at least one detection module is installed in the communication device.

29. The method of any one of clause 17 to 29, wherein the at least one detection module is installed in a battery of the communication device.

30. The method of any one of clause 17 to 29, wherein the at least one detection module is installed in an accessory of the communication device.

31. The method of any one of clause 17 to 30, wherein the first plurality of antennae are further configured to receive the first electromagnetic signals from a remote keyless entry (RKE) system located in the detection device, and the second plurality of antennae are further configured to receive the second electromagnetic signals from the remote keyless entry (RKE) system located in the detection device.

32. The method of any one of clause 17 to 31, wherein the first plurality of antennae are further configured to transmit the first electromagnetic signals to a passive entry passive start (PEPS) system located on the detection device, and the second plurality of antennae are further configured to transmit the second electromagnetic signals to the passive entry passive start (PEPS) system located on the detection device.

We claim:

1. A detection device comprising:
    at least one antenna configured to receive electromagnetic signals from a plurality of antennae located within an interior of a vehicle;
    at least one controller circuit communicatively coupled with the at least one antenna and configured to:
        identify a driver zone that includes a front driver seat of the vehicle and a front passenger seat of the vehicle, the front passenger seat being adjacent to the front driver seat of the vehicle;
        identify a reduced driver zone within the vehicle that excludes the front passenger seat;
        determine, based on the electromagnetic signals received by the at least one antenna, a position of a communication device within the interior of the vehicle relative to locations of the plurality of antennae;
        detect whether the front passenger seat is occupied;
        detect whether the communication device is within the driver zone or the reduced driver zone; and
        responsive to detecting that the front passenger seat is unoccupied and that the communication device is within the driver zone, inhibit at least some function of the communication device.

2. The detection device of claim 1, wherein the at least one controller circuit is configured to:
    determine a location of the communication device within another vehicle responsive to detecting that the front passenger seat of the other vehicle is unoccupied and that the communication device is within a driver zone of the other vehicle; and
    inhibit at least some function of the communication device.

3. The detection device in accordance with claim 1, wherein the plurality of antennae comprise remote keyless entry (RKE) antennae.

4. The detection device in accordance with claim 1, wherein the plurality of antennae comprise passive entry passive start (PEPS) antennae.

5. The detection device of claim 1, wherein the at least one antenna comprises a plurality of antennae coupled to respective groups of the plurality of antennae located within the interior of the vehicle.

6. The detection device of claim 1, further comprising a memory communicatively coupled with the at least one controller circuit comprising a plurality of programs associated with the vehicle.

7. The detection device in accordance with claim 1, wherein the detection device is disposed within the communication device.

8. The detection device in accordance with claim 7, wherein the detection device is disposed within a battery of the communication device.

9. The detection device in accordance with claim 7, wherein the detection device is disposed within an accessory of the communication device.

10. A method of using a detection device, comprising:
    identifying a driver zone that includes a front driver seat of a vehicle and a front passenger seat of the vehicle, the front passenger seat being adjacent to the front driver seat of the vehicle;
    identifying a reduced driver zone within the vehicle that excludes the front passenger seat;
    receiving, with an antenna, electromagnetic signals from a plurality of antennae located within an interior of a vehicle;
    the antenna communicatively coupled with at least one controller circuit;
    the at least one controller circuit included in at least one detection module that is communicatively coupled with a communication device;
    determining, with the at least one controller circuit and based on the electromagnetic signals received by the antenna, a position of the communication device within the interior of the vehicle relative to locations of the plurality of antennae;
    detecting whether the front passenger seat is occupied;
    detecting whether the communication device is within the driver zone or the reduced driver zone; and
    responsive to detecting that the front passenger seat is unoccupied and that the communication device is within the driver zone, inhibiting at least some function of the communication device.

11. The method of claim 10, wherein:
    the at least one controller circuit is further configured to:
        determine a location of the communication device within another vehicle responsive to detecting that the front passenger seat of the other vehicle is unoccupied and that the communication device is within a driver zone of the other vehicle; and
        inhibit, at least some function of the communication device.

12. The method in accordance with claim 10, wherein the plurality of antennae are remote keyless entry (RKE) antennae.

13. The method in accordance with claim 10, wherein the plurality of antennae are passive entry passive start (PEPS) antennae.

14. The method of claim 10, wherein the antenna comprises a plurality of antennae couple to respective groups of the plurality of antennae located within the interior of the vehicle.

15. The method of claim 10, further comprising a memory communicatively coupled with the at least one controller circuit comprising a plurality of programs associated with the vehicle.

16. The method in accordance with claim 10, wherein the detection device is disposed within the communication device.

17. The method in accordance with claim 16, wherein the detection device is disposed within a battery of the communication device.

18. The method in accordance with claim 16, wherein the detection device is disposed within an accessory of the communication device.

19. A non-transitory computer-readable storage media comprising instructions that, when executed, cause at least one processor to:
- identify a driver zone that includes a front driver seat of a vehicle and a front passenger seat of the vehicle, the front passenger seat being adjacent to the front driver seat of the vehicle;
- identify a reduced driver zone within the vehicle that excludes the front passenger seat;
- determine, based on electromagnetic signals received by at least one antenna, a position of a communication device within an interior of the vehicle relative to locations of a plurality of antennae;
- detect whether the front passenger seat is occupied;
- detect whether the communication device is within the driver zone or the reduced driver zone; and
- responsive to detecting that the front passenger seat is unoccupied and that the communication device is within the driver zone, inhibit at least some function of the communication device.

20. The non-transitory computer-readable storage media of claim 19, wherein the instructions, when executed, further cause the at least one processor to:
- determine a location of the communication device within another vehicle responsive to detecting that the front passenger seat of the other vehicle is unoccupied and that the communication device is within a driver zone of the other vehicle; and
- inhibit, at least some function of the communication device.

* * * * *